W. H. TOELLE.
LOCK HOUSING FOR SCREWS AND BOLTS.
APPLICATION FILED SEPT. 12, 1919.
1,339,075.
Patented May 4, 1920.
2 SHEETS—SHEET 1.
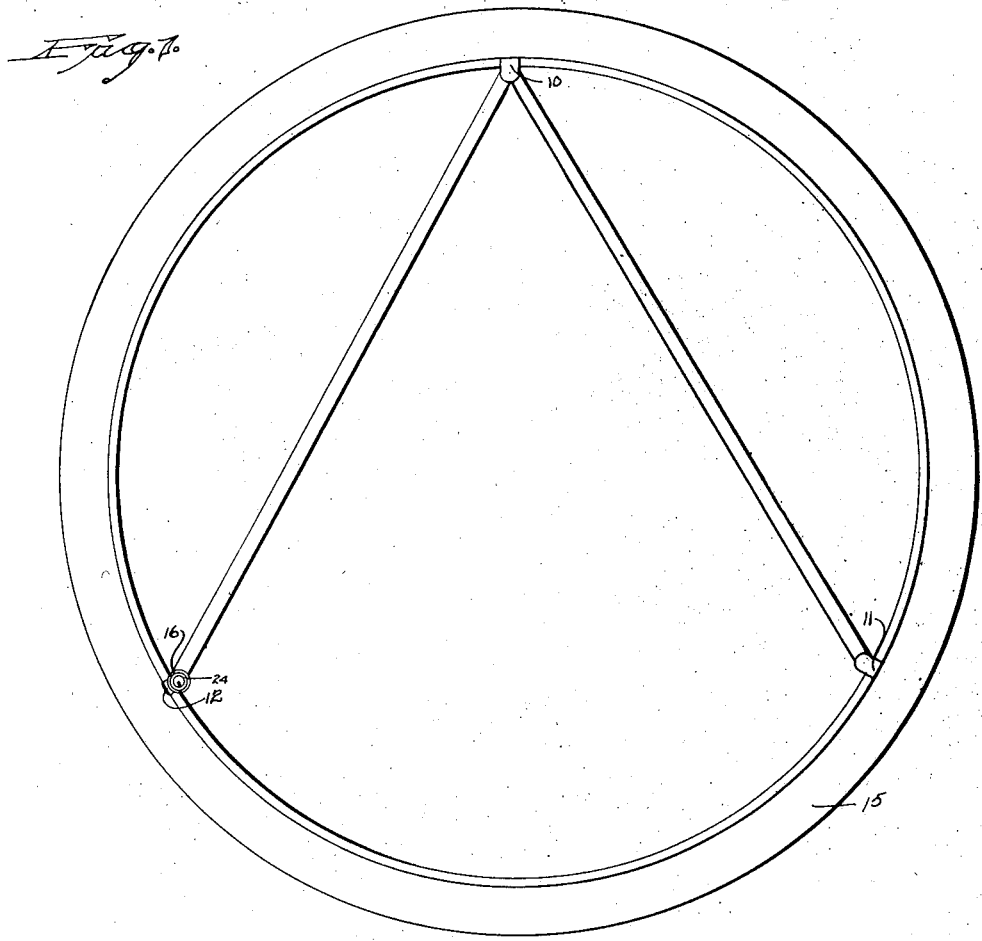
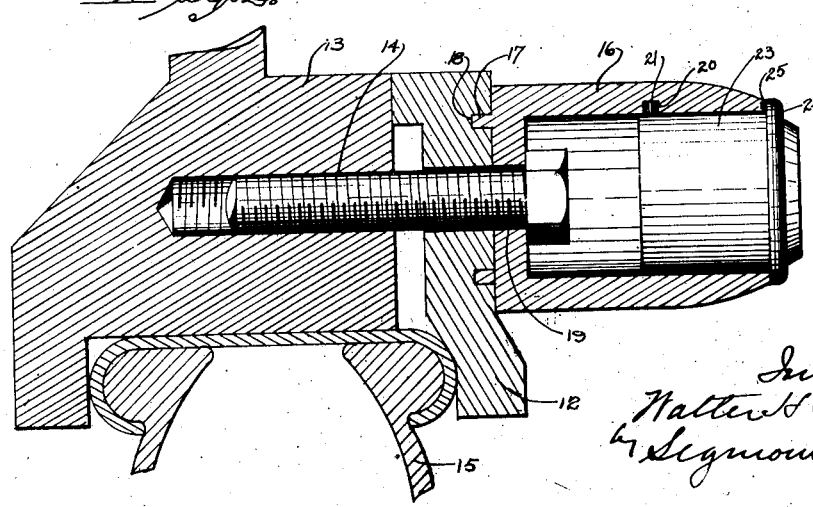

W. H. TOELLE.
LOCK HOUSING FOR SCREWS AND BOLTS.
APPLICATION FILED SEPT. 12, 1919.
1,339,075.
Patented May 4, 1920.
2 SHEETS—SHEET 2.
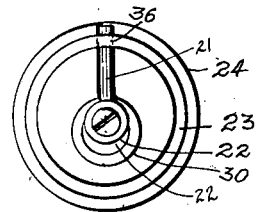
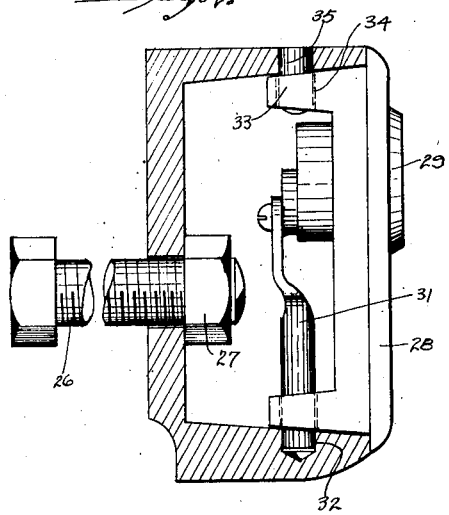
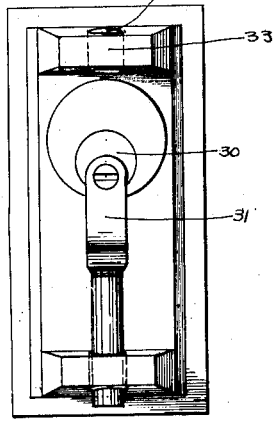

# UNITED STATES PATENT OFFICE.

WALTER H. TOELLE, OF WALLINGFORD, CONNECTICUT.

LOCK-HOUSING FOR SCREWS AND BOLTS.

1,339,075. Specification of Letters Patent. Patented May 4, 1920.

Application filed September 12, 1919. Serial No. 323,385.

*To all whom it may concern:*

Be it known that I, WALTER H. TOELLE, a citizen of the United States, residing at Wallingford, in the county of New Haven and State of Connecticut, have invented a new and useful Improvement in Lock-Housings for Screws and Bolts; and I do hereby declare the following, when taken in connection with the accompanying drawings and the characters of reference marked thereon, to be a full, clear, and exact description of the same, and which said drawings constitute part of this application, and represent, in—

Figure 1 a face view illustrating my invention as applied to a spare tire holder.

Fig. 2 a sectional view of the housing mechanism shown in connection with a spare tire holder, on an enlarged scale.

Fig. 3 a rear view of the lock mechanism detached.

Fig. 4 a sectional view illustrating a modified form of my invention.

Fig. 5 an inside view of the front closure and lock mechanism detached.

This invention relates to an improvement in lock housings for screws and bolts, the object of the invention being to provide a housing in which may be located the head of a screw or the nut on a bolt, with means for closing the housing so that access to the screw or nut cannot be had except by the proper person, and the invention consists in a lock housing for nuts and bolts having certain details of construction as will be hereinafter described and particularly recited in the claims.

My device is adapted for various uses, but for the purposes of illustration I have shown it as applied to a common form of spare tire holder which usually includes two fixed lugs 10 and 11, and a removable plate 12 adapted to be secured to a tire holder 13 by a screw 14, this plate overlapping the edge of a spare tire 15 as shown in Figs. 1 and 2 of the drawings, it being only necessary to remove the plate 12 in order to attach a spare tire. It frequently happens that these spare tires are stolen from cars, and as before stated, one purpose of this invention is to apply a housing to a screw for spare tire holders, and as shown in Figs. 1 and 2 of the drawings, I employ a housing 16 which may be round as shown in Figs. 1 and 2 of the drawings, or rectangular as shown in Figs. 4 and 5 of the drawings or any other design. For this particular purpose the housing will be formed at its rear end with lugs 17 adapted to enter a recess 18 formed for them in the plate 12. The housing will also have a hole 19 in its inner wall through which a screw is passed, the screw extending through the plate 12 and into the holder 13 or other device. This screw may be firmly turned into place with any approved implement, depending upon the nature of the head of the screw, and the housing is formed with an internal groove or notch 20 adapted to receive a locking arm 21 mounted on a roll-back 22 of a pin tumbler lock the case 23 of which is recessed at its inner end and has an opening 36 for the arm 21 by which that arm is guided. The said case closely fits into the housing the outer end of which is closed by the usual lock flange 24, the lock casing being adapted to be held against rotation by providing the inner face of the flange 24 with a short projection 25 entering a recess formed for it in the outer edge of the housing 16. When the screw or bolt has been set as described, the housing is closed by the lock cylinder which is locked to the housing, and so that access to the screw or bolt cannot be had except by one having a key adapted to operate the lock so as to remove the lock casing.

In Fig. 4 of the drawings I have illustrated a housing used in connection with a bolt 26 having a nut 27 which it is desired to protect. In this case the threaded end of the bolt extends into the housing and the housing is set over the bolt and then the nut is applied. In this figure also I have shown a rectangular housing with a correspondingly shaped rectangular face plate or cover 28 in which the lock cylinder 29 is mounted, the roll-back 30 being provided with an eccentrically mounted arm 31 which engages with a locking notch 32 formed for it in one of the walls of the housing, while the other end of the casing is formed with an inwardly extending arm 33 formed with a passage 34 adapting it to be set over a pin 35 projecting into the housing. In this case the proper key will lift the locking arm out of engagement with the housing and permit the front wall or cover to be removed so that access may be had to the nut or screw protected by the housing. In either construction the head of the screw or nut on the bolt for any purpose may be housed and access thereto prevented except to the proper person.

I claim:—

1. A lock housing for screws and bolts, comprising a housing having a rear wall formed with an opening through which a screw or bolt may extend, a closure for the open forward end of the housing and means for interlocking the closure with the housing.

2. A lock housing for screws and bolts comprising a housing formed with a hole in its inner wall and open at its outer end, means for holding the housing against rotation, a closure for the open end of the housing, and lock mechanism mounted in said closure, said lock mechanism including an eccentric and a locking arm connected with the eccentric and adapted to extend into engagement with the housing.

3. A lock housing for screws and bolts comprising a housing formed at its rear end with an opening and opened at its outer end, said housing also formed with an internal annular groove, a lock casing adapted to close the outer end of the housing, and means for interlocking the lock casing with the housing.

In testimony whereof, I have signed this specification in the presence of two subscribing witnesses.

WALTER H. TOELLE.

Witnesses:
D. W. LANOUETTE,
FREDERICK H. WERNER.